United States Patent [19]
Boesch et al.

[11] 3,954,362
[45] May 4, 1976

[54] TRANSFER MOLDING THERMOSETTING POLYMERIC MATERIAL

[75] Inventors: Donald Edward Boesch, Trenton; Yusuf Taher Koita, Lawrenceville, both of N.J.

[73] Assignee: Western Electric Co., Inc., New York, N.Y.

[22] Filed: June 27, 1975

[21] Appl. No.: 590,889

Related U.S. Application Data

[62] Division of Ser. No. 446,887, Feb. 28, 1974, Pat. No. 3,911,075.

[52] U.S. Cl. .................... 425/130; 425/245 R; 425/247; 425/248; 425/252
[51] Int. Cl.² .................... B29C 9/00; B29F 1/12
[58] Field of Search .......... 425/130, 145, 161, 166, 425/131.1, 242 R, 243, 245, 247, 248, 251, 252

[56] References Cited
UNITED STATES PATENTS

| | | | |
|---|---|---|---|
| 2,293,304 | 8/1942 | Muller et al. ....................... | 425/248 |
| 2,337,550 | 12/1943 | Crosby ............................ | 425/130 X |
| 2,418,856 | 4/1947 | Stacy .............................. | 425/130 X |
| 2,627,087 | 2/1953 | Hendry ............................ | 425/145 X |
| 2,709,834 | 6/1955 | Johnson ........................... | 425/131.1 X |
| 3,245,116 | 4/1966 | Hendry ............................ | 425/130 X |
| 3,352,952 | 11/1967 | Marr .............................. | 425/131.1 X |
| 3,599,290 | 8/1971 | Garner ............................ | 425/130 X |
| 3,650,654 | 3/1972 | Schwartz .......................... | 425/247 X |
| 3,888,612 | 6/1975 | Schreve et al. .................... | 425/130 |
| T904,007 | 11/1972 | Garner ............................ | 425/130 X |

*Primary Examiner*—J. Howard Flint, Jr.
*Attorney, Agent, or Firm*—D. P. Kelley; R. Spencer

[57] ABSTRACT

In transfer molding thermosetting polymeric materials, a first preform of first thermosetting polymeric material having a volume substantially equal to the volume of the die cavities is placed in the transfer chamber adjacent the runners. A second preform of second thermosetting polymeric material cheaper than the first polymeric material is placed in the transfer chamber above the first preform. The transfer chamber is pressurized and the second preform is deformed and pressurizes and deforms the first preform and causes the first thermosetting polymeric material to flow through the runners into the die cavities. After curing, the molded articles consisting of first thermosetting polymeric material are removed from the die cavity, and scrap cull and runner consisting substantially of cheap second thermosetting polymeric material are removed from the mold runners and the bottom of the transfer chamber. Thus, considerable economies are effected. The material of the second preform is selected for certain physical properties. Various means are shown for loading the transfer chamber.

3 Claims, 10 Drawing Figures

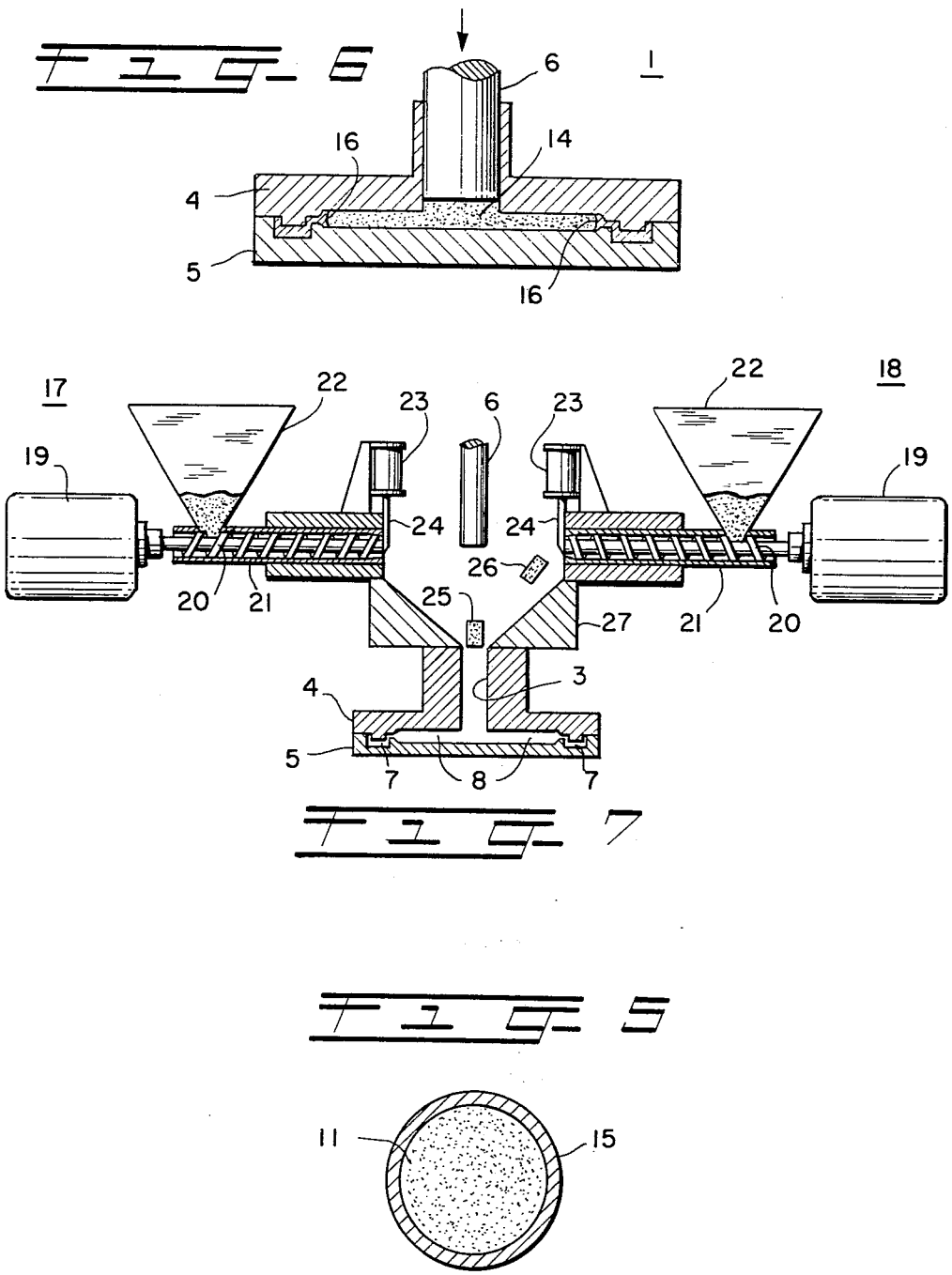

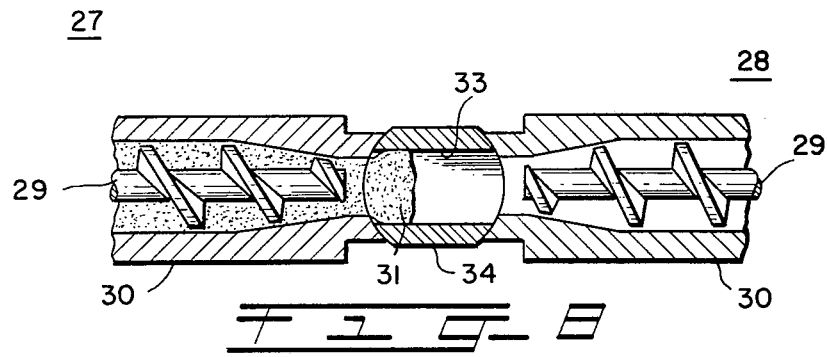
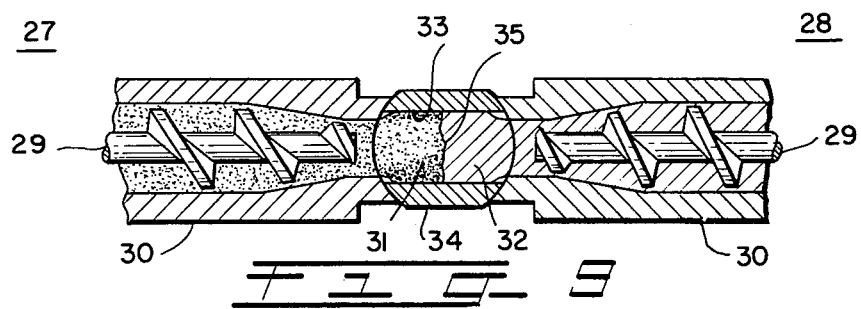
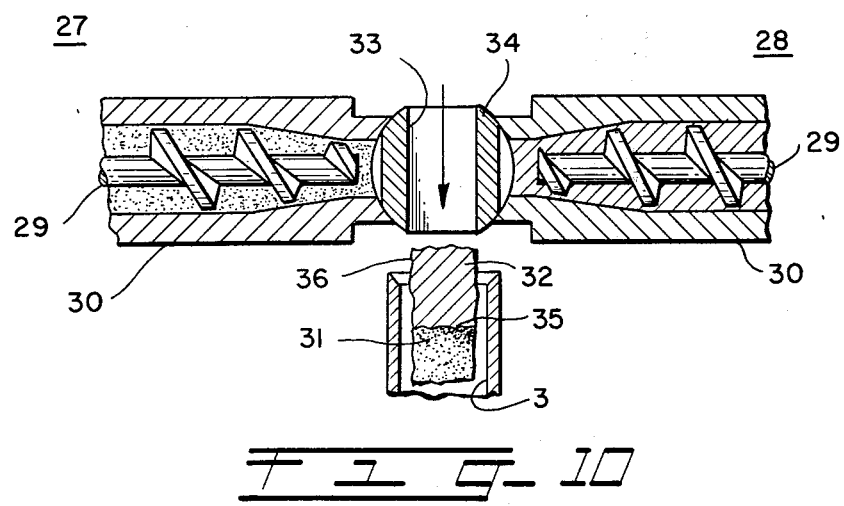

TRANSFER MOLDING THERMOSETTING POLYMERIC MATERIAL

This is a division of application Ser. No. 446,887, filed Feb. 28, 1974, now U.S. Pat. No. 3,911,075.

BACKGROUND OF THE INVENTION

1. Field of the Invention

This invention relates broadly to apparatus for the transfer molding of thermosetting polymeric materials. More specifically, this invention relates to apparatus for reducing or substantially eliminating the amount of relatively expensive thermoset polymeric material customarily remaining as cull and runners in transfer molding apparatus at the conclusion of a molding cycle.

2. Description of the Prior Art

In the transfer molding of thermosetting polymeric materials as conventionally practiced, a preform of such material, which may have been heated dielectrically previously, is placed in a heated transfer chamber. A ram is advanced into the transfer chamber against the preform and forces the preform material through the runners of the molding apparatus to the several die cavities. At the conclusion of the molding cycle, the apparatus including dies is opened, and the molded articles removed from the die cavities. That preform material remaining as cull and runners outside the die cavities, which material has set, is removed. Due to the irreversibility of the setting of the material, the cull and runners cannot be reused in a subsequent molding operation and must therefore be discarded as scrap or ground and used as filler for other purposes. Since thermosetting polymeric materials are relatively expensive, losses thereof as scrap for the reasons hereinbefore noted represent substantial economic charges against the efficiency of the operation.

There is no prior art in the field of transfer molding of thermosetting polymeric materials teaching method or means for reduction or substantial elimination of losses of desirable thermosetting polymeric materials remaining as runners and cull at the conclusion of a molding cycle.

Prior art of general interest in the broad field of molding polymeric materials is found in the following U.S. Patents:

U.S. Pat. No. 2,269,953 (1942) to Morin et al.
U.S. Pat. No. 3,650,654 (1972) to Schwartz
U.S. Pat. No. 3,599,290 (1971) to Garner
U.S. Pat. No. 3,221,373 (1965) to Kwan
U.S. Pat. No. 2,627,087 (1953) to Hendry
U.S. Pat. No. 2,327,079 (1943) to Wacker The Morin et al. patent above noted bears at most a superficial resemblance to one aspect of the present invention in that several charges of polymeric material are arranged in a cylinder and the charges are injected seriatim under pressure into a die cavity. However, the Morin et al. patent is directed only to the molding of thermoplastic polymeric materials, the charges are of the same thermoplastic polymeric material although the charges may be colored differently apparently to produce a variegated product, and all of the charges are injected into the die cavity leaving nothing in the passageway leading to the die cavity.

SUMMARY OF THE INVENTION

One of the objects of this invention is to provide improved apparatus for the transfer molding of thermosetting polymeric materials.

Another of the objects of this invention is to provide means for reducing or substantially eliminating the quantity of relatively expensive thermoset material conventionally lost as scrap in the form of culls and runners in the operation of transfer molding apparatus.

Other and further objects of this invention will become apparent during the course of the following description and by reference to the accompanying drawings and the appended claims.

Briefly, we have discovered that all of the foregoing objects may be attained by placing in the transfer chamber adjacent the runners leading to the die cavities a first body of thermosetting polymeric material which is to fill the said die cavities and which usually is relatively expensive, and a second of relatively inexpensive thermosetting polymeric material adjacent the first said body. By applying pressure in the transfer chamber directly to the second body, the said second body forces the first said body through the runners and into the die cavities. By properly proportioning the relative amounts of first and second bodies in the transfer chamber, the cull and runners of thermoset polymeric material at the conclusion of the molding cycle will consist substantially of the material of the second body alone. The material of the second body is selected for certain desired physical properties. The first and second bodies preforms prepared by compacting under pressure powders of the desired materials, or may be a single preform having two layers of compacted powders of the desired materials. Alternately, the first and second bodies may be slugs of the desired materials produced by two cooperating screw extruders feeding a hopper serving the transfer chamber or feeding both ends of a cut-off wheel which is then rotated to serve the slugs to the transfer chamber.

BRIEF DESCRIPTION OF THE DRAWINGS

Referring now to the drawings in which like numerals represent like parts in the several views:

FIG. 5 represents an enlarged transverse cross-section of a runner, taken along the line 5—5 of FIG. 4;

FIG. 6 represents diagrammatically the apparatus of FIG. 4 after the die cavity has been filled, showing as another end result the substantially transverse interface between the two bodies of thermoset polymeric material at the conclusion of the molding cycle;

FIG. 7 represents diagrammatically a section in elevation of one form of apparatus for making slugs consisting of two discrete bodies of different thermosetting polymeric materials according to the present invention;

FIG. 8 represents diagrammatically a medial longitudinal section of another form of apparatus for making slugs consisting of two discrete bodies of different thermosetting polymeric materials according to the present invention, at the beginning of a cycle;

FIG. 9 represents diagrammatically a medial longitudinal section of the apparatus of FIG. 8, at an intermediate portion of the cycle;

FIG. 10 represents diagrammatically a medial longitudinal section of the apparatus of FIG. 8, at the conclusion of the cycle, showing the slug being discharged into a transfer chamber.

DESCRIPTION OF THE PREFERRED EMBODIMENTS

Figure 1:
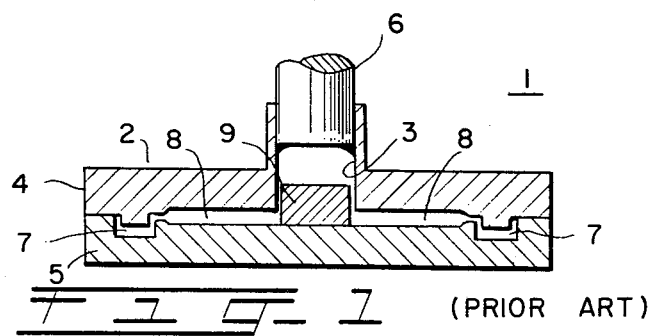
FIG. 1 represents diagrammatically a medial longitudinal section through conventional transfer molding apparatus showing a conventional preform of thermosetting polymeric material in the transfer chamber prior to being forced under pressure through runners to two die cavities.
Figure 2:
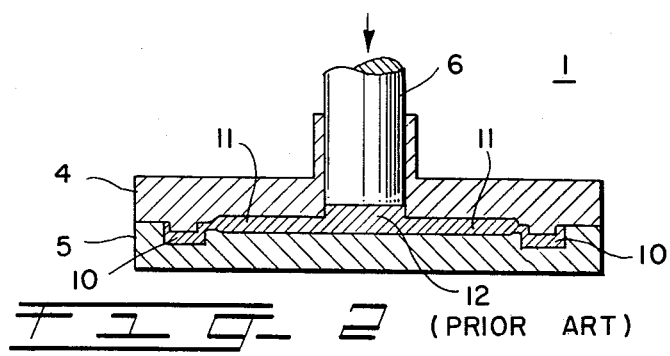
FIG. 2 represents diagrammatically the apparatus of FIG. 1 after the material of the preform has been forced under pressure through the runners and into the die cavities.

Conventional transfer molding apparatus 1 for thermosetting polymeric materials is shown in FIGS. 1 and 2 as comprising mold 2 having formed therein transfer chamber 3 and die element 4, and die element 5 mating with die element 4. Transfer chamber 3 is adapted to slidably receive pressurizing ram 6. Die element 4 defines the tops of several die cavities 7 (two of which are shown) as well as the tops of runners 8 communicating between the transfer chamber 3 and the said die cavities 7. Die element 5 defines the bottoms and sides of the die cavities 7, as well as the bottoms of runners 8. When die elements 4 and 5 are assembled together in mating relationship, runners 8 define closed channels or conduits communicating between the transfer chamber 3 and the closed die cavities 7.

In a conventional transfer molding operation, a preform 9 of thermosetting polymeric material may be heated, for example dielectrically, to bring the preform 9 rapidly to optimum molding temperature, and is placed in the transfer chamber 3 of the transfer molding apparatus 1, which likewise has been heated, as shown in FIG. 1. Ram 6 is advanced into transfer chamber 3 against preform 9 and forces the material of preform 9 through runners 8 into die cavities 7, as shown in FIG. 2. After the material has cured, die elements 4 and 5 are separated, and the thermoset material removed from the transfer molding apparatus in the form of molded articles 10 corresponding with the shape of die cavities 7, runners 11 corresponding with the shape of the runners 8 of the transfer molding apparatus 1 and attached to the said molded articles 10, and a cull 12 corresponding to the shape of the bottom end of the transfer chamber 3 and attached to the said runners 11. The molded articles 10 are then separated from the runners 11. Due to the irreversibility of the curing process, the thermoset material remaining in the runners 11 and cull 12 cannot be reused in a subsequent molding operation and must be discarded as scrap, or ground and used as a filler in some other, unrelated operation. The volume of thermoset material remaining as runners 11 and cull 12 may be substantial relative to the volume of the die cavities 7 and therefore a substantial portion of the material of the original preform 9 is lost as scrap. Frequently, the cost of the thermosetting polymeric material is relatively expensive, but nevertheless a necessary adjunct of the molding operation if molded articles 10 of superior physical and chemical characteristics are desired. Thus, the combination of relatively expensive thermosetting polymeric material and relatively large volume of runners 11 and cull 12 compared to the volume of the die cavities 7 can seriously adversely affect the economics of the molding operation.

The present invention reduces or substantially eliminates the relatively large quantity of expensive thermosetting polymeric material conventionally lost as scrap in the form of runners 11 and cull 12.

Figure 3:
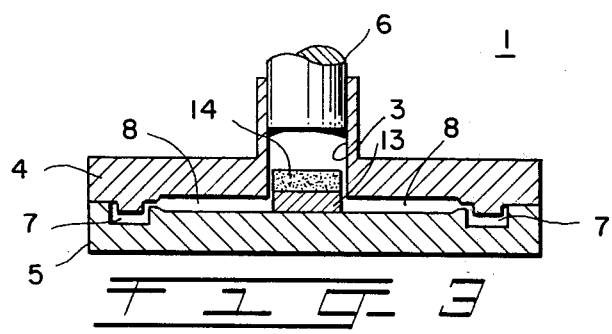
FIG. 3 represents diagrammatically the apparatus of FIG. 1, showing in the transfer chamber of preform according to the present invention and comprising two different thermosetting polymeric materials, prior to advancement of the ram into the transfer chamber.
Figure 4:
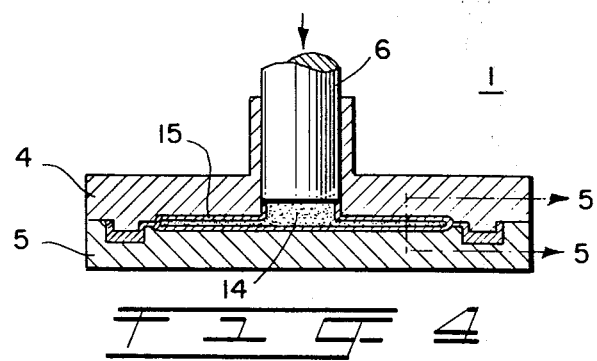
FIG. 4 represents diagrammatically the apparatus of FIG. 3 after the die cavities have been filled, showing as one end result a small portion of that thermoset polymeric material which has filled the die cavities remaining as a relatively thin skin on the cull and runners at the conclusion of the molding cycle.

In one embodiment of the present invention, as shown in FIG. 3, a preform 13 of thermosetting polymeric material which is to fill die cavities 7 and which has a volume substantially equal to the volume of said die cavities 7 is placed at the bottom of the transfer chamber 3, and superposed over preform 13 in transfer chamber 3 is preform 14 of thermosetting polymeric material which is to remain as runners 11 and cull 12 after the molding operation. The material of preform 14 is selected so as to be considerably less expensive than the material of preform 13, to have a higher viscosity than the material of preform 13 under the conditions of the transfer molding operation, and preferably to adhere well, after curing, to the material of preform 13. The cheaper cost of the material of preform 14 sharply improves the economics of the molding operation. The higher viscosity of the material of preform 14 under transfer molding conditions prevents the said material from pushing through the material of preform 13 and entering the die cavities 7, the preferred mode of operation. The cheaper material in preform 14 would, if it entered the die cavities 7, adversely affect the quality of molded articles 10. It should be noted, however, that where that portion of the die cavity 7 adjacent runner 8 (i.e., the inlet end of the die cavity 7) defines a non-functional part of the molded article 10, entrance into said portion of the die cavity 7 of the cheaper material, whereby said non-functional part of the molded article 10 is formed from said cheaper material, is an acceptable condition. The adherence of the material of preform 14 to that of preform 13, after curing, permits the simultaneous removal of molded articles 10, runners 11 and cull 12 from the opened transfer molding apparatus 1. Advantageously, the materials of preforms 13 and 14 should have the same, or substantially similar, dielectric heating characteristics, i.e., they should, when being preheated dielectrically, heat at the same rate. This permits the two preforms 13 and 14 to be preheated simultaneously in the same dielectric heating apparatus. The volume of preform 13 is determined so that, at the conclusion of the molding operation, the die cavities 7 are filled only with the material of preform 13, with the exception for non-functional parts of the molded articles 10 as above noted, with an allowance for a thin skin of said material of preform 13 which may line the runners 8 and the wall at the bottom of transfer chamber 3, and with an allowance for a slug (not shown) of the material of preform 13 which, because of an area of stagnation in runners 8 at the bottom of transfer chamber 3, may commence to be displaced along runners 8 by the material of preform 14 only when the ram 6 is adjacent the bottom of its stroke, said slug not reaching a die cavity 7 by the conclusion of the molding operation. The volume of preform 14 is determined so that, at the conclusion of the molding operation, such material remains only as runners 11 and cull 12 and does not enter the die cavities 7, again with the exception for non-functional parts of the molded articles 10, as above noted. FIG. 4 shows the apparatus of FIG. 3 at the end of a molding operation, the ram having been advanced against preform 14 thereby to force the material of preform 13 through runners 8 and into the die cavities 7. The material of preform 13 enters runners 8 prior to the material of preform 14 and this, coupled with the fact that there may be temperature differences of substantial magnitude between the transfer molding apparatus and the material of preform 13 (the walls of the apparatus usually being considerably warmer than the material, and sometimes to such a degree as to initiate cross-linking and setting of the material of preform 13 adjacent the walls of the apparatus) may result in a thin skin 15 of the material of preform 13 forming on the walls of runners 8 (FIG. 5). In summary, the ram 6 pushes the material of preform 14, and the material of preform 14 pushes the material of preform 13. After the materials of preforms 13 and 14 have cured as molded articles 10 and as runners 11 and cull 12, respectively, the mold 2 is opened, and the molded articles 10, runners 11 and cull 12 removed. The adherence of the materials of preforms 13 and 14 to each other after curing (viz., the adherence of molded articles 10 to the ends of runners 11) permits the simultaneous and automatic removal of the said molded articles 10, runners 11 and cull 12 from the opened mold 2.

Preforms 13 and 14 may be made by compacting under pressure the material to constitute each preform.

Alternatively, a single preform consisting of two discrete bodies of different thermosetting polymeric materials may be made by compacting under pressure the appropriate materials in one operation. If this alternative is employed, it will be apparent that the single preform must be inserted into the transfer chamber 3 with that body of material which is to fill the die cavities 7 arranged adjacent to runners 8.

In the practice of the present invention, the preferred embodiment of transfer molding apparatus 1 is designed so that the entrances to the die cavities 7 are all equispaced from the transfer chamber 1. Otherwise, it would not be possible to have, at the conclusion of the molding operation, the desired condition as shown in FIG. 4 in all runners 8 and die cavities 7. Thus, with die cavities 7 separated from transfer chamber 3 by runners 8 of unequal length, it is possible that some of the less expensive material from preform 14 would enter that die cavity 7 closer to transfer chamber 3 than other die cavities 7 (which, however, may be acceptable if the less expensive material forms only non-functional parts of the molded articles 10, as hereinbefore noted), or an excessive amount of relatively expensive material from preform 13 would remain in that runner 8 of greater length than the other runners 8, or a combination of these two possibilities might result.

The following examples illustrate the practice of the embodiment of FIGS. 3 and 4.

EXAMPLE 1

Preform 13 consisted of glass-filled phenolic molding compound.
Preform 14 consisted of general purpose phenolic molding compound.
Preform temperatures—approximately 200°–235°F.
Die and runner temperatures—approximately 350°F.

EXAMPLE 2

Preform 13 consisted of glass-filled diallyl phthalate molding compound.
Preform 14 consisted of alkyd molding compound.
Preform temperatures—approximately 200°–235°F.
Die and runner temperatures—approximately 350°F.

It should be noted that certain other materials which, strictly speaking, are not categorized as thermosetting polymeric materials, may be used to constitute preform 14. Such materials must set or cross-link in the heated mold 2 in the same manner as a thermosetting polymeric material. Thus, cross-linkable elastomeric materials like some rubbers may be employed in preform 14.

By making a suitable selection of material for preform 14 to push a specific material through runners 8 of appropriate length into die cavities 7 of the transfer molding apparatus 1, substantially transverse (relative to the overall direction of travel of materials through runners 8, and thus perpendicular to the longitudinal axes of the said runners 8) interfaces 16 between the said materials of preforms 13 and 14 in the said runners 8 may be provided, which interfaces 16 will advance from the transfer chamber-end of runners 8 toward the die cavity-end of the said runners 8. These interfaces 16 are not, strictly speaking, true planes, being only slightly curved, but this curvature is so slight that the said interfaces 16 for convenience may properly be termed transverse to the overall direction of flow of the materials through runners 8. FIG. 6 shows such substantially transverse interfaces 16 in runners 8 at the end of a molding operation. Working in this mode would provide even greater control over the economics of the molding operation. It will be understood that, under some conditions, there may still be a very thin skin on runners 11 of the material of preform 13 overlying the material of preform 14, this skin not being shown in FIG. 6 to avoid obfuscating the said figure.

In the embodiment of FIG. 7, two extruders 17 and 18 are provided, each with a drive motor 19 operating an extrusion screw 20 surrounded by housing 21. In each of said extruders 17 and 18, a hopper 22 communicates with extrusion screw 20 through housing 21, and is adapted to feed thermosetting polymeric material thereto. At the discharge end of each extrusion screw 20, a fluid-powered cylinder 23 is provided to operate a vertically reciprocable cut-off blade 24 as shown. For convenience, extruders 17 and 18 may be arranged in opposed relation as indicated diagrammatically. Suitable means are provided to collect the products 25 and 26 of extruders 17 and 18, respectively, and to guide said products 25 and 26 to the inlet end of transfer chamber 3; such means may comprise hopper 27 as shown.

The operation of the embodiment of FIG. 7 will now be described.

Hopper 22 of extruder 17 is filled with that thermosetting polymeric material which is intended to fill die cavities 7. Hopper 22 of extruder 18 is filled with that cheaper, less desirable thermosetting polymeric material which is to push the desirable material into die cavities 7 and which is to remain as scrap cull and runners. Extruders 17 and 18 are each operated in the known manner, and fluid-powered cylinders 23 are operated in a predetermined sequence so that their respective cut-off blades 24 sever slugs of heated extrudate in the desired relative proportions and sequence so that said slugs 25 and 26 enter the transfer chamber 3 in the desired order, viz., slug 25 from extruder 17, and consisting of the heated material destined for die cavities 7 enters transfer chamber 3 first and slug 26 from extruder 18 and consisting of the heated cheaper material destined for scrap enters transfer chamber 3 second and on top of slug 25. Ram 6 is advanced into transfer chamber 3 onto slug 26 and the operation proceeds essentially as described for the preceding embodiment of FIGS. 4 or 5.

In the embodiment of FIGS. 8-10, two extruders 27 and 28 are provided in opposed relation as shown, each of the said extruders 27 and 28 comprising an extrusion screw 29 rotated in housing 30 by suitable drive motor means (not shown) and fed by suitable means such as a hopper (not shown). Extruders 27 and 28 discharge warm extrudates 31 and 32, respectively, into the opposite ends of an opening 33 in rotatable cut-off wheel 34, the said extrudates 31 and 32 meeting at an interface 35 in the said opening. The cut-off wheel 34 is rotatable by suitable means (not shown) between a first position in which the opening 33 is adapted to receive extrudates 31 and 32 from extruders 27 and 28 and a second position normal to said first position and adapted to discharge slug 36 from the opening 33 therein to transfer chamber 3 of transfer molding apparatus 1, or to suitable means, such as a trough, to convey the said slug 36 to transfer chamber 3 while maintaining the slug 36 in the proper orientation.

The operation of the embodiment of FIGS. 8-10 will now be described.

Extruder 27 is fed with that thermosetting polymeric material which is intended to fill die cavities 7 of transfer molding apparatus 1, and extruder 28 is fed with that cheaper, less desirable thermosetting polymeric material which is to push the desired material into the said die cavities and which is to remain as scrap cull and runners. The proportions of the two thermosetting polymeric materials required for this purpose are determined from the geometry of the transfer molding apparatus 1 including die cavities 7, runners 8 and transfer chamber 3, and the extruders 27 and 28 are operated in such a manner as to discharge heated extrudates 30 and 31, respectively, into the opening 33 of cut-off wheel 34, positioned as shown in FIGS. 8 and 9 relative to the said extruders 27 and 28, the said extrudates 30 and 31 meeting at an interface 35 within the said opening 33, to form slug 36 consisting of the desired proportions of materials from the extruders 27 and 28. Preferably, as shown in FIG. 8, extruder 27 is operated first to discharge the desired amount of heated extrudate 31 destined for die cavities 7 into opening 33, and then extruder 28 is operated to discharge the desired amount of heated extrudate 32 destined for scrap cull and runners into opening 33 to complete the formation of slug 36. Thereafter, with extruders 27 and 28 stopped, cut-off wheel 34 is rotated to the position shown in FIG. 10 so that opening 33 therein is aligned with transfer chamber 3, the said cut-off wheel 34 being rotated in such direction that the extrudate 31 portion of slug 36 is adjacent transfer chamber 3. Thereupon, slug 36 is transferred to transfer chamber 3, either dropping out of opening 33 by gravity or being pushed out of said opening 33 by suitable means indicated diagrammatically by arrow 37. Ram 6 is then advanced into transfer chamber 3 against the extrudate 32 portion of slug 36, and the molding operation continues as hereinbefore described.

The following example shows materials suitable for the practice of the invention as embodied in FIGS. 7-10:

EXAMPLE 3

Material extruded by extruder 17 (FIG. 7) or extruder 27 (FIGS. 8-10) — diallyl phthalate molding compound.

Material extruded by extruder 18 (FIG. 7) or extruder 28 (FIGS. 8-10) — alkyd molding compound.

Temperature of extrudates—approximately 210°F.
Die and runner temperatures—approximately 350°F.

What is claimed is:

1. Apparatus for forming a slug consisting of a first body of first material and a second body of second material, said first and second bodies of material contacting each other along an interface intermediate the two ends of said slug, said apparatus comprising:
   a. a first extruder having an outlet end;
   b. a second extruder having an outlet end;
   c. said first and second extruders being arranged with their respective outlet ends facing each other;
   d. said first and second extruders being adapted to extrude first and second materials, respectively, said first and second materials contacting each other along an interface;
   e. means interposed between the outlet ends of said first and second extruders and adapted to simultaneously sever said first material and said second material from said first and second extruders, respectively, on both sides of said interface.

2. Apparatus as in claim 1, wherein:
f. said last-mentioned means comprises:
   i. slug-forming means having a chamber extending therethrough, one end of said chamber being adapted to communicate with the outlet end of said first extruder and the opposite end of said chamber being adapted to communicate with the outlet end of said second extruder;
   ii. positioning means to position said slug-forming means with said chamber communicating with the outlet ends of said first and second extruders or selectively to position said slug-forming means with said chamber out of communication with the outlet ends of said first and second extruders.

3. Apparatus as in claim 1, wherein:
f. said last-mentioned means comprises:
   i. a cut-off wheel having a chamber extending completely therethrough in a straight line, one end of said chamber being adapted to communicate with the outlet end of said first extruder and the opposite end of said chamber being adapted to communicate with the outlet end of said second extruder;
   ii. means to rotate said cut-off wheel to a first position in which said chamber communicates with the outlet ends of said first and second extruders or selectively to a second position substantially at right angles to said first position.

* * * * *